Figure 1:
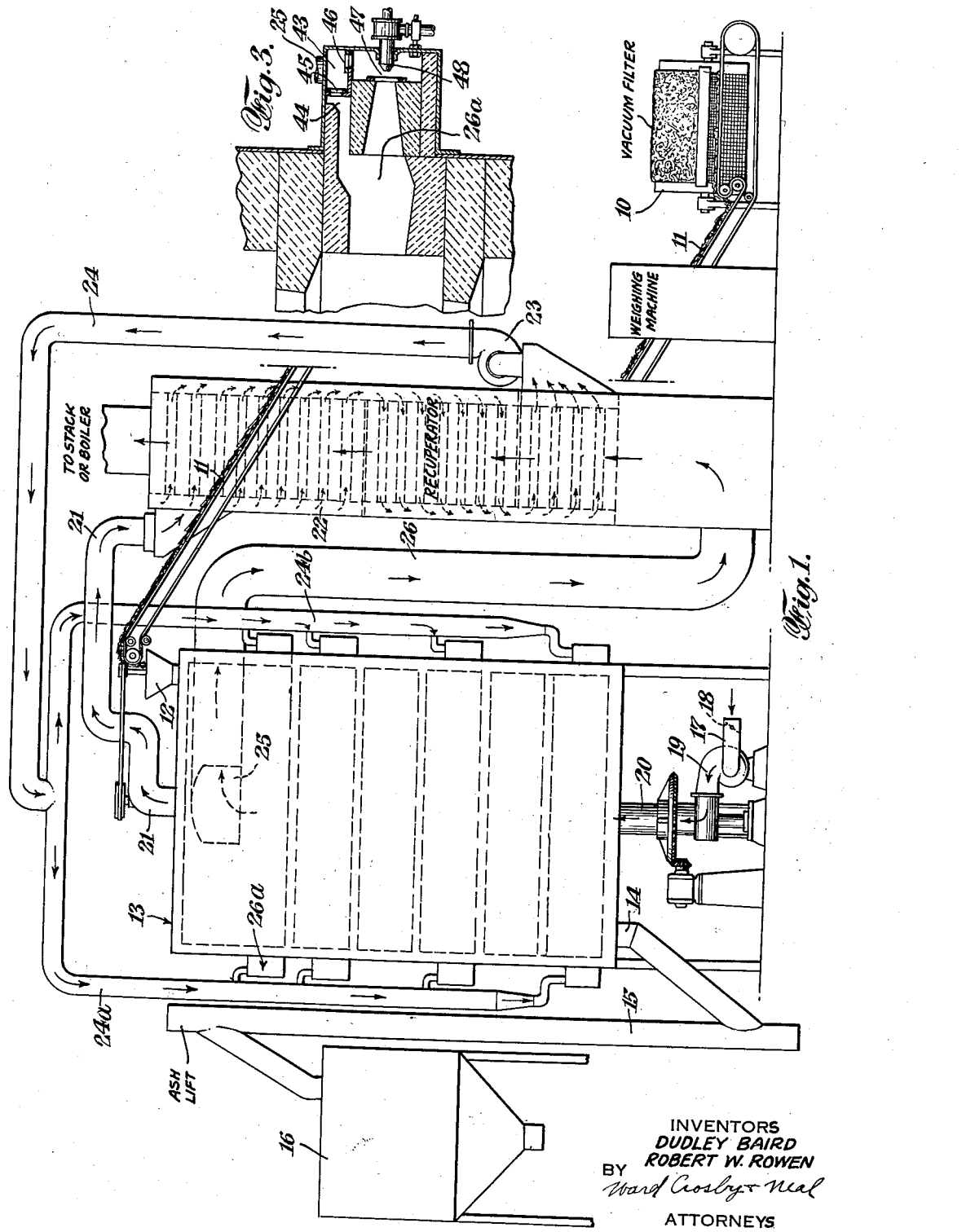

Patented Sept. 17, 1935

2,015,050

UNITED STATES PATENT OFFICE 2,015,050

INCINERATING METHOD AND APPARATUS

Dudley Baird, Berkeley, Calif., and Robert W. Rowen, New York, N. Y., assignors to Nichols Engineering and Research Corporation, New York, N. Y., a corporation of Delaware Application April 26, 1935, Serial No. 18,373

10 Claims. (Cl. 110—15)

This invention relates to processes and apparatus for incinerating sewage sludge.

Prior to our invention the incineration of sewage sludge has involved various difficulties, which have precluded the successful and economical incineration on a practical commercial basis of the sewage sludge such as is produced in large quantities by municipal sewage treatment plants. Some of these difficulties have arisen for the following reasons. First, it is difficult to insure the satisfactory elimination of the highly obnoxious odors ordinarily arising when attempts are made to burn such material. And of course if such odors are not eliminated, the disposal of sewage sludge by incineration will not ordinarily be tolerated. And secondly, the sewage sludge involves a relatively large moisture content, generally in the neighborhood of or in excess of 90%, and although the sludge may be filtered so as to reduce the water content to from 60 to 85% for example, this large remaining percentage of moisture is still so high as to preclude economical and satisfactory incineration by processes proposed prior to our invention. Furthermore, prior attempts to incinerate sewage sludge have generally involved kiln constructions and processes which are expensive and inconvenient in operation and still do not insure thorough combustion of the material. For example, relatively large quantities of expensive fuel have been required either for predrying or for burning the material, and various kiln constructions necessitate the expense of labor in continuous attendance.

While we are aware that the incineration of garbage and garbage mixtures and sewage screenings having a considerable fuel value has heretofore been attempted in various instances (with apparatus and equipment different from that hereinafter described), the incineration of such material does not involve the problems of economically incinerating sewage sludge filter cake because of the quite different nature of the latter material with its relatively high moisture content and relatively low fuel value. We have also found that the incineration of sewage sludge because of its relatively finely divided nature and tendency to accumulate and stick together in adhering masses, presents a further problem in attempting to uniformly dry and burn the same without evolution of odoriferous gases requiring special treatment.

Inasmuch as sewage sludge is substantially continuously produced in the operation of sewage treatment plants, it is particularly desirable to provide a continuous method of incinerating the sludge to avoid any substantial obnoxious accumulations of it at the treatment plants. To this end our invention is particularly advantageous inasmuch as when the apparatus of our invention is operated continuously, uniformly successful results may be obtained with great economy of fuel as compared with batch processes of incineration heretofore proposed for various materials.

According to our present invention, the above difficulties of incinerating sewage sludge are satisfactorily overcome. The sewage sludge may be continuously incinerated as fast as produced and filtered in the sewage treatment plant, but at little or no expense for fuel. Yet with our invention the gaseous products of combustion are free of all obnoxious odors and perceptible smoke, and the resulting small quantity of ash is wholly free of any troublesome organic matter and hence may be readily disposed of.

Various further and more specific objects, features and advantages will clearly appear from the detailed description given below taken in connecton with the accompanying drawings which form a part of this specification and illustrate merely by way of example a preferred form of the apparatus of the invention.

The invention consists in such novel features, arrangements and combinations of parts as may be shown and described in connection with the apparatus herein disclosed, and also such novel methods and combinations of method steps as are disclosed and described herein.

Figure 2:
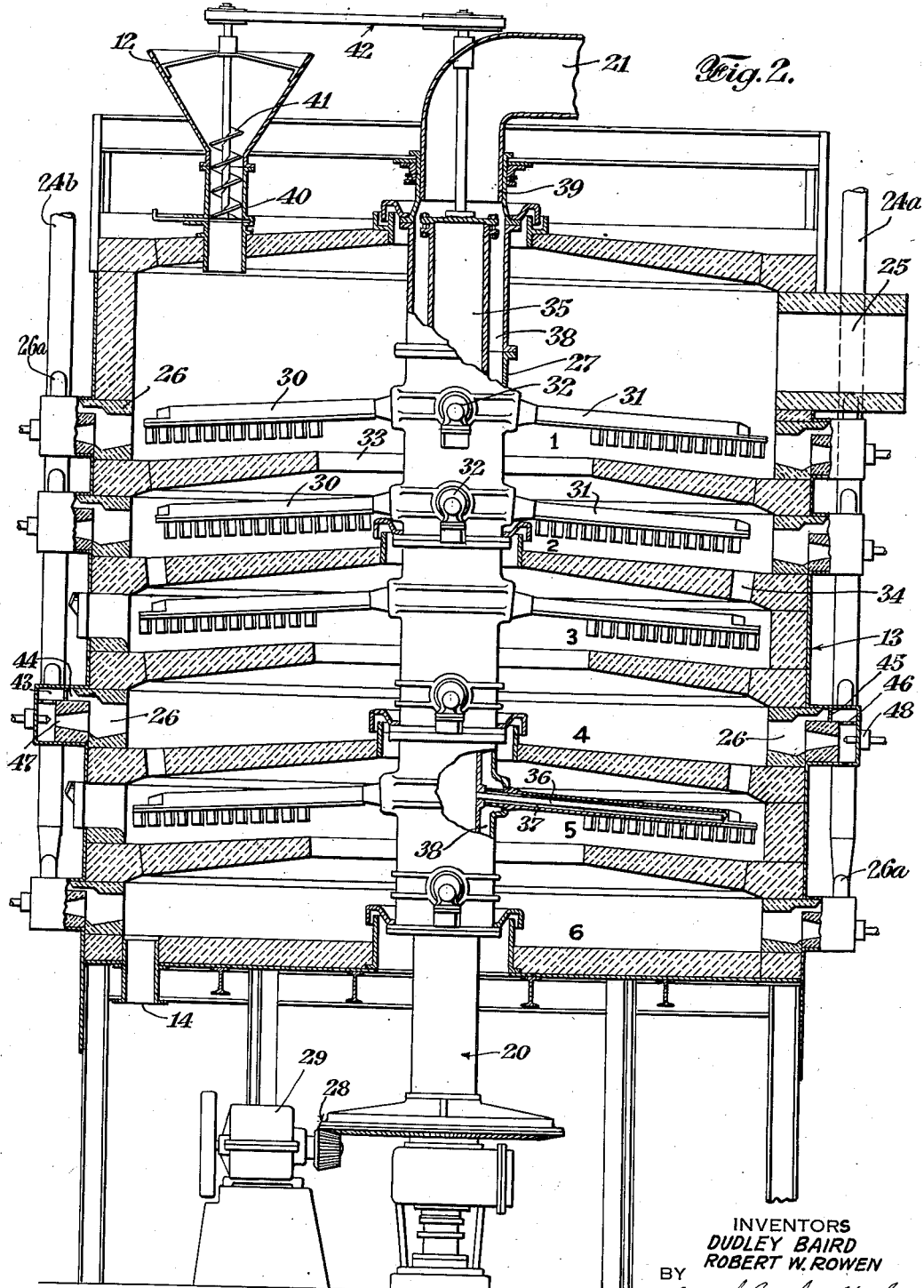

In the drawings, Fig. 1 illustrates one form of apparatus embodying the apparatus invention and in which the process of the invention may also be carried out;

Fig. 2 is a vertical sectional view partly broken away showing the incinerating furnace comprised in the apparatus of Fig. 1; and Fig. 3 is a sectional view showing certain details of the apparatus.

Referring to Fig. 1, a rotating cloth drum form of vacuum filter, which for example may be of the Oliver type, is indicated at 10 for continuously forming and discharging sewage sludge filter cake onto a belt conveyor 11. This conveyor may preferably be passed through a suitable weighing machine as indicated, whereby the quantity of the filter cake being produced may be readily determined from time to time and the incinerating furnace controlled accordingly. The conveyor may then discharge the more or less broken pieces of filter cake into a hopper 12 at the top of a multiple hearth furnace 13, the construction of which is further shown in Fig. 2 and described in detail hereinafter.

In this furnace the filter cake is first thoroughly dried on the upper hearths and then incinerated on hearths further down and finally the resulting ash may be somewhat cooled on the lower hearth or hearths. The ash is discharged through a furnace outlet at 14 and may be carried by an ash lift 15 to an ash bin 16.

As will be hereinafter described in further detail, the furnace 13 may preferably be of a type having a central shaft and rabbling arms provided with cooling conduits. Cooling air for these conduits may be introduced through an intake pipe 17 provided with a regulating damper 18. This air may be forced by a blower 19 into the base of the central furnace shaft 20, thence through the various cooling conduits of the furnace shaft and rabble arms and out through a conduit 21 at the top of the furnace. In passing through the cooling conduits, this air may become heated for example to a temperature in the neighborhood of 400° F. In order to further preheat this air for use in aiding combustion in the furnace, it may be conveyed from the conduit 21 through a recuperator 22 of any suitable known construction, and thence out to a blower 23 connected to a conduit 24 for conveying the preheated air back to the furnace.

In the recuperator 22, the air from the cooling conduits of the furnace may be brought into heat interchanging relationship with the air and gaseous products of combustion coming from the interior of the furnace through an outlet 25 located preferably adjacent the top of the furnace, this outlet being brought into communication with the lower part of the recuperator through a conduit 26. The hot air and products of combustion from the furnace pass up through the recuperator and as above stated are brought into heat interchanging relationship with the preheated air derived from the cooling conduits, but without mixing therewith. The gaseous products of combustion and air which come from the furnace outlet 25 may be of a temperature for example in the neighborhood of 1000° F. and by passage through the conduit 26 and the recuperator their temperature may be lowered, for example to 750° F. and at such temperature they may be passed out at the top of the recuperator to a stack, or waste heat boiler to further utilize the heat value thereof.

The air from the cooling conduits of the furnace on the other hand, upon leaving the recuperator, has been raised for example to a temperature in the neighborhood of 700° F. and is thus now sufficiently preheated to be economically introduced into the spaces above the hearths in the furnace.

In order that this preheated air may be distributed to both sides of the furnace, the conduit 24 may be extended by a plurality of branches as at 24a and 24b, each extending downwardly along the furnace walls. Each of these branches may be formed with openings as at 26a communicating through control dampers hereinafter described, with the space above various of the hearths.

Referring now to Fig. 2, the incineration furnace 13 may comprise a cylindrical wall suitably lined with refractory material and arranged to enclose and support a plurality of superimposed hearths. We have found that a furnace of this type provided with about four of such hearths gives satisfactory results with our invention. In Fig. 2 we have illustrated a six hearth furnace, for providing a greater capacity. These hearths as shown are numbered 1 to 6 inclusive. The furnace may be provided with a central shaft, the outer casing of which is indicated at 27, rotated by suitable gearing as at 28 which in turn may be driven through a reduction gear assembly indicated at 29. A plurality of radially extending rabble arms as at 30, 31 may be supported on this shaft in a position to extend over each of the hearths. We have found it desirable for the upper hearths, say hearths Nos. 1 and 2, to provide as many as four of these rabble arms over each hearth, whereas for the lower hearths, for example hearths Nos. 3 to 6 inclusive, two of such rabble arms may be ample. Thus with a larger number of rabble arms at the upper hearths where the sludge filter cake in relatively bulky condition is being dried and broken up into small pieces, a more frequent and rapid rabbling action is provided which not only has the advantage of more promptly breaking up the cake into fine pieces for thorough drying, but also prevents the material from resting in one position long enough to afford opportunity for the particles to be baked together into larger masses or to dry and harden the surface while the core of the mass is still wet. And in the lower parts of the furnace the lesser number of rabble arms permits the material to remain on the hearths for a relatively longer period to insure thorough incineration. Since the material is less bulky after being partially burned, there is ample space on the lower hearths to provide for the relatively slower travel of the material thereover.

In Fig. 2 at hearths Nos. 1 and 2, in each case two of the rabble arms 30 and 31 are shown in side view, the other two arms extending at right angles thereto, end views of the latter being indicated at 32. At hearths Nos. 3 to 6 inclusive which are shown as provided with but two rabble arms, the arms over alternate hearths extend in directions at right angles to those on the intervening hearths. Each of the rabble arms is provided with a plurality of depending rabbling teeth. These teeth are arranged at an angle such that upon rotation of the central shaft and arms, the material on hearth No. 1 will be advanced periodically while being rabbled, in a direction toward the center of the hearth until it drops through a central drop hole 33 to hearth No. 2. At hearths Nos. 3 and 5 the rabble arms are also provided with teeth positioned so as to advance the material toward central drop holes, as on hearth No. 1. Hearths Nos. 2, 4 and 6 on the other hand, are provided with rabble arms having teeth at an angle such as to rabble the material from the center toward the periphery of the hearths, where it drops through peripheral hearth openings as at 34. By the action of the rabble teeth the broken pieces are rather uniformly distributed in horizontal layers over the various hearths and the material is temporarily retained on each hearth for a sufficient length of time to complete the treatment intended on each hearth before it is advanced to the lower hearths. Thus until such time as the moisture is sufficiently driven off, the material is kept from interfering with the desired temperature conditions and combustion at hearths lower down. As the filter cake is agitated and advanced by the rabble teeth, substantially all portions of it are brought directly in contact with the countercurrent flow of hot gases of combustion and air, which insure rapid and uniform drying at the upper hearths and thorough burning at hearths further down.

The upper surfaces of the hearths may be covered with a bed of material, much of which will more or less permanently remain in position and serve as a means for protecting the hearth and supporting the rabbled material which passes thereover at such an elevation that the lower ends of the rabble teeth may be considerably spaced from the surface of the hearth whereby there is no danger of clogging the apparatus or wearing of the hearth surface.

The central shaft 27 may be provided with an inner cold air conduit 35 communicating with internal conduits as at 36 of each rabble arm (one of which is indicated partially in section at hearth No. 5), so that the cooling air comes up through the internal conduit of the central shaft and passes into the internal conduits of each rabble arm to the ends thereof, from which points it may be returned through concentric passages as at 37 within the rabble arms, back to an annular passage 38 within the shaft 27. Thus the shaft and rabble arms are protected against any deterioration or warping which might otherwise result from overheating and at the same time the air thus used is partially preheated in preparation for its further use in the process. The annular space 38 communicates with the conduit 21, running to the recuperator as above described. Suitable swivel joint means as at 39 may be provided to connect the shaft 27 to the conduit 21.

In some cases it may be desirable to so construct the furnace that the space above the top hearth will be somewhat larger than that above the other hearths. In this way gases of combustion may be retained within the furnace somewhat longer and if it should be found upon their arrival in the top of the furnace that these gases still contain noxious odors, they may be subjected to a high temperature in this space before passing to the outlet 25.

The sewage sludge filter cake is preferably fed substantially continuously into the furnace from the hopper 12 through a chute 40, provided with suitable feeding means precluding the entrance of air at this point and also such as to prevent the escape of gaseous products of combustion. In the particular example shown, a screw feed 41 is indicated for this purpose and is satisfactory where the supply of filter cake is substantially continuous. However, other well-known forms of feeding means may be used. The screw feed 41 may be driven by any suitable means, as for example, a belt and pulley arrangement 42 driven by the rotating central shaft.

The means for introducing the preheated air at the various inlets as at 26a will now be described, the details of construction of one example of such means being shown in Fig. 3. At each of these inlets the preheated air from the conduits 24a or 24b may first pass into a small chamber as at 43, from which part of the air may be conveyed through passage 44 directly to the inlet 26a. The passage 44 may be provided with an adjustable damper as at 45. Further quantities of the air may be passed through an adjustable damper as at 46 to a burner chamber as at 47, into which a burner as at 48 projects. The burners as at 48 may comprise oil or gas burners of suitable known types for projecting a flame into or through the air inlets 26a. The adjustable dampers as at 45 and 46 thus permit of the introduction of a desired proportion of the preheated air into proximity of the burner flame and at the same time an adjustable quantity of additional preheated air may be introduced directly to the furnace independently of the burner.

Burner boxes such as described in connection with Fig. 3 may be provided at several of the hearths. For example, in the construction as shown, a pair of such burner boxes are provided respectively at each of the hearths Nos. 1, 2, 4 and 6.

As to the various features and details of construction of the furnace shown in the drawings, but which are not hereinabove fully described, reference may be had to multiple superimposed hearth furnaces of the types heretofore used in the metallurgical art, and examples of which are shown in the patents to Herreshoff, No. 976,175, granted November 22, 1910 and Baird, No. 1,669,925, granted May 15, 1928.

The operation of the process may be described as follows. The raw sewage, the sludge from which is to be incinerated by this invention, may be first treated by various processes known in the art. For example, the raw sewage may be treated by the chemical precipitation process of adding lime and ferric chloride in such manner as to cause flocculation and sedimentation in sedimentation tanks, thickeners or clarifiers. The sludge thus produced, containing from 90 to 92% moisture, is mixed with further lime and ferric chloride to condition the sludge for filtration. It is then filtered on the vacuum type of cloth covered drum filter, such as indicated at 10 in Fig. 1. If desired, however, the raw sewage may be preliminarily treated by other known sedimentation processes followed by decomposition of the settlable solids by anaerobic bacteria action, the decomposed material then being treated with ferric chloride or ferric sulphate and filtered with a continuous filter to give a filter cake containing from 72 to 78% moisture, for example. Various other preliminary treatments may be used followed by filtering with the same type of filters to produce a filter cake varying in moisture content, for example, from in the neighborhood of 60 to 85%. In most cases a filter cake having a moisture content in the neighborhood of 70% may be readily obtained, although of course the invention may be used to incinerate a cake having a lower or higher moisture content.

Where the sewage is preliminarily treated in digestors under the action of anaerobic bacteria, the gases given off by decomposition of the sludge may be collected and used to supply extraneous fuel for the incinerator, to supplement, or in place of, the use of oil fuel. These gases, for example, may embody about 75% of methane and 25% of carbon dioxide, and have a fuel value of about 700 B. t. u. per cubic foot. The quantity of such gas from digestion depends upon the length of the period of the digestion cycle and may vary from ½ to 1½ cubic feet per day per capita of the population served by the treatment plant. Thus such gases may provide a very satisfactory supply of fuel.

The filter or filters as at 10 continuously produce a sludge filter cake which may be in the neighborhood of ¼" or less in thickness. With a typical example, the moisture content of the filter cake amounted to about 70% and the solids were made up of about 52% combustible material and 48% ash, including about 8% lime. The heat value of this cake amounted to about 5500 B. t. u. per pound of dry solids.

As the filter cake falls to the conveyor, it is broken up in pieces which may be several inches square. These pieces are continuously conveyed to the top of the furnace and as they pass through the intake and drop on to the first hearth, they are further broken up and become more and more broken and finely divided as rabbled over each hearth and down through the furnace. As the material arrives at the area of burning in the furnace, the larger particles are reduced to a diameter of ½" or less.

During a typical period of operation of the furnace, the gas leaving hearth No. 1 was at a temperature of 780° F. The gases over the other hearths were at the following temperatures:

| | |
|---|---|
| No. 2 hearth | 850° F. |
| No. 3 hearth | 1050° F. |
| No. 4 hearth | 1500° F. |
| No. 5 hearth | 1250° F. |
| No. 6 hearth | 700° F. |

It was found that during considerable periods, these temperatures could be maintained with proper incineration without the use of fuel at the burners. The action on the first three hearths served to thoroughly dry the material and break it into small pieces. On hearth No. 3 and largely on hearth No. 4, most of the distillation and combustion of the volatile gases took place and it was found that this occurs at such temperature that noxious gases from such gases were substantially eliminated. The flames from the combustion of the volatile gases at hearth No. 4 extend to some extent over hearth No. 3 as well. At hearth No. 5 there is substantially complete combustion of the remaining fixed carbon and coke-like parts of the material. This is evidenced by a considerable amount of purple flame occurring at this hearth, such purple flame also extending slightly over the areas adjacent the drop holes on hearth No. 4 above and at the center of hearth No. 6 below. The combustion of the carbon content is completed on hearth No. 6 and during the latter part of the travel of the material over hearth No. 6 the ash is partially cooled before its passage out of the outlet 14.

With the above described apparatus, during this typical operation thereof, the filter cake was incinerated at the rate of about 43 tons per day, and the moisture content was about 66%.

The maximum temperatures within the furnace are preferably kept below 1900° F. or thereabouts, to insure against such temperatures as might cause troublesome fusion of the non-combustible portions of the material and slagging of the ash.

During this typical operation of the furnace the temperatures of the gases and air in the various conduits were as given above in connection with the description of the apparatus. The preheated air was introduced over hearths Nos. 2, 4 and 6, approximately one-half of such air being introduced over hearth No. 6, a considerable quantity also being introduced at hearth No. 4 and a lesser quantity at hearth No. 2. The total amount of preheated air admitted was sufficient to provide approximately 50% in excess of the theoretical requirements for complete combustion of the combustible portion of the sewage sludge. With this particular example of the operation of the process, the furnace embodied six hearths, each approximately 17 ft. in diameter, the height of the furnace being about 25 ft. The central shaft was rotated approximately one revolution per minute, at which speed the material under treatment passes through the furnace from the intake to the ash outlet in about 40 minutes.

Where the supply of filter cake is not continuously uniform or is abnormally low in amount, or contains relatively high moisture content, as well as when the furnace is being brought up to proper operating temperatures, it is necessary to use additional heat beyond the fuel value of the sewage sludge and this is provided by burning oil at the burners 48. In such cases the quantity of air introduced at the burners for the combustion of the oil, may preferably be kept down to about 25% in excess of the theoretical amount necessary for combustion of the oil. In cases where the amount of sludge or its moisture content is less than that in the particular example above given, the region of highest temperatures in the furnace may move up from the fourth hearth to the third hearth, but in general the temperature conditions in the furnace should be maintained so that the distillation and combustion of the volatile gases occurs at the mid portion or zone of the furnace so that the material has opportunity to be thoroughly and uniformly dried and to become relatively finely divided in the upper hearths before burning.

During another typical operation of the furnace with the burners operating, the gas temperatures over the various hearths were as follows:

| | |
|---|---|
| No. 1 hearth | 1100° F. |
| No. 2 hearth | 1500° F. |
| No. 3 hearth | 1550° F. |
| No. 4 hearth | 1300° F. |
| No. 5 hearth | 1000° F. |
| No. 6 hearth | 420° F. |

In this instance filter cake embodying about 72% moisture with a fuel value of 5300 B. t. u. per pound of dry solids, was treated at the rate of about 33 tons per day in the above described apparatus. Preheated air was admitted at hearths Nos. 2, 4 and 6 as before. In this case the distillation and burning of the volatile gases began at hearth No. 2 and continued on hearth 3 and the burning of the remaining fixed carbons and coke-like materials began near the "in" drop hole on hearth No. 3 and was completed on hearths Nos. 4 and 5. The oil used for fuel at the burners amounted to about 6½ gallons per hour and this small amount was found to be ample to safely maintain the necessary temperature conditions in the furnace. The fuel value of filter cake as produced in many sewage treatment plants in this country may vary from about 4000 to 7000 B. t. u. per pound of dry solids.

We have found that if the temperatures are controlled in general accordance with the example last given above, so as to provide a temperature at the top hearth of at least 1100° F. just prior to the exit of the gases, then all danger of perceptible obnoxious odors in the exit gases is eliminated.

However, with both of the above described examples of the operation of the process, the stack gases were entirely free of obnoxious odor and also free of perceptible smoke. The remaining ash was finely divided and substantially free of organic material. The ash may thus be readily disposed of as filling material, for example, with complete assurance that it will not be objectionable. The amount of ash is relatively small.

In the above described examples of the operation of the process, the entire volume of sewage sludge produced from a sewage system serving a population of over 175,000 was treated. Thus, it is apparent that under normal conditions a tremendous amount of filter cake may be finally disposed of by the process of this invention at a cost substantially below the usual cost of merely carting away the sewage sludge, and with the added advantage that all objectionable matter is eliminated.

Due to the manner in which the material is rabbled while being gradually advanced, dried and burned over the various hearths, any tendency for the material to remain in relatively large lumps or to roll up into large masses or accumulations, is prevented. Hence any tendency for the formation of hardened and dried incrustations surrounding and protecting masses of undried or unburned material, is eliminated and this is done automatically without the necessity of keeping a workman in attendance to stir the material or break up any large accumulations such for example as would occur if the treatment were attempted in furnaces of the rotary kiln type.

The apparent complete or nearly complete elimination of noxious odors from the gaseous products of combustion substantially at areas or hearths where these gases are distilled from the filter cake and burned, was an unforeseen result. It is believed that this effect results from the fact that the material is first relatively thoroughly dried and brought into finely divided condition and then quickly burned without smoldering before its arrival at the hearths where combustion occurs. The elimination of the noxious odors is evidently further aided by reason of the fact that the flames from the combustion area, due to the countercurrent flow of the gases, envelop the material as it is being rabbled in finely divided condition just prior to its passage into the combustion area, so that such noxious gases as may have a tendency to be distilled from the material prior to its burning, are immediately mixed and burned with the hot burning gases from below. Thereby substantially none of the gas evolved from the material is permitted to escape without being subjected to the requisite high temperature to destroy the odoriferous gas components thereof. However, if the temperature of the gases above the top hearth are kept at about 1100 F. or above either by the flow of hot gases from below or by the use of additional heat from burners at the top of the furnace, then any remaining odors in the gases and the odor of any gases or vapors which may be evolved from the filter cake while on the top hearth, are safely eliminated before the gases pass out of the exit.

The manner in which the drying and burning particles of filter cake are rabbled from each hearth to the next, further serves to insure uniform treatment and the elimination of obnoxious gases. That is, the rabbling action is such as to gradually advance the material through the various drop holes in distributed condition with no large amounts or bodies of the material falling on to any hearth at any one place. Thus, the desired temperature conditions on each hearth are maintained without any interruption arising from introducing additional material on to each hearth.

This application comprises a continuation in part of our copending application Serial No. 610,032, filed May 9, 1932.

While the invention has been described in detail with respect to particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent of the United States is:

1. The continuous process of treating and incinerating sewage sludge to form an ash substantially free of organic material and evolved gases free of noxious odor, which comprises continuously filtering the sludge to form filter cake the moisture content of which is less than 90% but substantially in excess of the content of solids, then conveying said cake as formed to a point where it is passed downwardly through a plurality of superposed zones, temporarily retaining said cake in substantially horizontal layers at each of said zones while periodically agitating and advancing it through each zone and gradually from zone to zone, subjecting the filter cake at intermediate zones to a temperature sufficient to burn substantially all of the organic material therefrom and sufficient to substantially eliminate noxious odors from the evolved gases, utilizing heat from such burning to preheat a stream of air, introducing a controlled amount of said preheated air onto the cake at said intermediate zones, passing a stream of heated gases including the hot evolved gases from the burning cake, over the layers of cake at said intermediate zones and then over the cake at the upper zones whereby the cake is dried in the upper zones, the ash being allowed to become relatively cooler at the lower zone or zones.

2. The continuous process of treating and incinerating sewage sludge to form an ash substantially free of organic material and evolved gases free of noxious odor, which comprises removing from the sludge a sufficient percentage of the moisture content so as to provide a material embodying in the neighborhood of from 60 to 85% moisture and combustible solids with fuel value in the neighborhood of from 4000 to 7000 B. t. u. per pound of dry solids, then passing such material downwardly through a plurality of superposed zones, temporarily retaining said material in substantially horizontal layers at each of said zones while periodically agitating and advancing it through each zone and gradually from zone to zone in the presence of a countercurrent stream of hot gases and air, subjecting the material at intermediate zones to a temperature sufficient to eliminate therefrom substantially all of the organic matter, and subjecting the gases after being evolved from the material to a temperature sufficient to substantially eliminate noxious odors therefrom, heat from the intermediate zones being conveyed by said countercurrent stream to the upper zones whereby the material is dried in the upper zones, the ash being allowed to become relatively cooler at the lower zone or zones.

3. The continuous process of treating and incinerating sewage sludge to form an ash substantially free of organic material and evolved gases free of noxious odor, which comprises continuously filtering the sludge to form filter cake the moisture content of which is less than 90% but substantially in excess of the content of solids, then conveying said cake as formed to a point where it is passed downwardly through a plurality of superposed zones, temporarily retaining said cake in substantially horizontal layers at each of said zones while periodically agitating and advancing it through each zone and gradually from zone to zone countercurrent to a stream of air and gases, subjecting the filter cake at intermediate zones to a temperature sufficient to eliminate therefrom substantially all of the organic matter, applying a controlled amount of preheated air onto the cake at said intermediate zones to aid combustion, the resulting gases after being evolved from the cake being subjected to a temperature sufficient to substantially eliminate noxious odors therefrom.

4. The continuous process of treating and incinerating sewage sludge to form an ash substantially free of organic material and evolved gases free of noxious odor, which comprises removing from the sludge a sufficient percentage of the moisture content so as to provide a material embodying in the neighborhood of from 60 to 85% moisture, then passing such material downwardly through a plurality of superposed zones, temporarily retaining said material in substantially horizontal layers in each of said zones while periodically agitating and advancing it through each zone and gradually from zone to zone, subjecting the material at intermediate zones to a temperature sufficient to eliminate therefrom substantially all of the organic matter, and subjecting the gases after being evolved from the material to a temperature of in the neighborhood of from 1200 to 1500° F. to eliminate noxious odors therefrom heat from the intermediate zones being conveyed to the upper zones by gases and air flowing countercurrent to the movement of the material whereby the material is dried in the upper zones, the ash being allowed to become relatively cooler at the lower zone or zones.

5. Apparatus for incinerating sewage sludge material, comprising a furnace having a plurality of superposed hearths, including a top hearth for drying and an intermediate hearth for incinerating the material, and a lower hearth for permitting the resulting ash to become relatively cooled, an inlet at the top of said furnace provided with means for continuously feeding the sludge material into the top of said furnace, said inlet being substantially sealed against the escape of gases therethrough, rabbling means provided with teeth cooperating with each of the hearths for periodically agitating and advancing the sludge material over each hearth and gradually from hearth to hearth down through the furnace, said rabbling means embodying conduits for conveying cooling air therethrough, a recuperator, a gas outlet for the exit gases of the furnace and means for withdrawing and conveying gases from said outlet through said recuperator, means for conveying air heated by passage through the conduits of said rabbling means, into heat interchanging relationship with the exit gases from the furnace at said recuperator whereby said air is further heated, and means for then introducing a part of such preheated air into contact wih sludge material burning at the incinerating hearth of the furnace.

6. Apparatus for incinerating sewage sludge material, comprising a furnace having a plurality of superposed hearths, including a top hearth for drying and an intermediate hearth for incinerating the material, and a lower hearth for permitting the resulting ash to become relatively cooled, an inlet at the top of said furnace provided with means for continuously feeding the sludge material into the top of said furnace, rabbling means provided with teeth cooperating with each of the hearths for periodically agitating and advancing the sludge material over each hearth and gradually from hearth to hearth down through the furnace, said rabbling means embodying conduits for conveying cooling air therethrough, a recuperator, a gas outlet for the exit gases of the furnace and means for withdrawing and conveying gases from said outlet through said recuperator, means for conveying air heated by passage through the conduits of said rabbling means, into heat interchanging relationship with the exit gases from the furnace at said recuperator whereby said air is further heated, and conduit means for then introducing air thus preheated into contact with sludge material burning at the incinerating hearth of the furnace.

7. Apparatus for incinerating sewage sludge material, comprising a furnace having a plurality of superposed hearths, including a top hearth for drying and intermediate hearths for incinerating the material, and a lower hearth for permitting the resulting ash to become relatively cooled, an inlet at the top of said furnace provided with means for continuously feeding the sludge material into the top of said furnace, rabbling means provided with teeth cooperating with each of the hearths for periodically agitating and advancing the sludge material over each hearth and gradually from hearth to hearth down through the furnace, said rabbling means embodying conduits for conveying cooling air therethrough, a recuperator, a gas outlet for the exit gases of the furnace and means for withdrawing and conveying gases from said outlet through said recuperator, means for forcing a stream of fresh air through said recuperator in heat interchanging relationship with said exit gases whereby such air is preheated, and conduit means communicating with the spaces over a plurality of said intermediate hearths for introducing controlled amounts of such preheated air into contact with the sludge material burning at said hearths.

8. The continuous process of treating and incinerating sewage sludge to form an ash substantially free of organic material and evolved gases free of noxious odor, which comprises continuously filtering the sludge to remove a substantial percentage of the moisture content and to form filter cake, then passing such continuous supply of filter cake downwardly through a plurality of superposed zones, temporarily retaining said cake in substantially horizontal layers at each of said zones while periodically agitating it and causing it to be broken into fine pieces and maintaining it in finely divided condition while advancing it through each zone and gradually from zone to zone in the presence of a countercurrent stream of hot gases and air, subjecting the finely divided cake at an intermediate zone or zones to a temperature sufficient to substantially eliminate the organic matter therefrom, and subjecting the gases and vapor upon being evolved from the cake and thereafter to a temperature sufficient to substantially eliminate noxious odors therefrom, the heat from the intermediate zone or zones being conveyed by said countercurrent stream to a higher zone or zones whereby the material is dried in the higher zone or zones.

9. The continuous process of treating and incinerating sewage sludge to form an ash substantially free of organic matter and evolved gases free of noxious odor, which comprises filtering the sludge to substantially reduce the moisture content and to form filter cake, then passing a substantially continuous supply of such filter cake downwardly through a plurality of zones, temporarily retaining said cake in substantially horizontal layers in each of said zones while periodically agitating it and causing it to be broken into finer pieces and advancing it through each zone and gradually from zone to zone, subjecting the cake at an intermediate zone or zones to a temperature sufficient to eliminate therefrom the greater part of the organic matter, and subjecting the gases after being evolved from the material to a temperature in the neighborhood of 1100° F. or higher to eliminate noxious odors therefrom, heat from the intermediate zone or zones being conveyed to an upper zone or zones by gases and air flowing countercurrent to the movement of the cake particles whereby the cake is substantially uniformly dried and heated in the upper zone or zones.

10. Apparatus for incinerating sewage sludge material comprising a furnace having a plurality of superposed hearths, including a top hearth for drying and an intermediate hearth or hearths for incinerating the material, an inlet at the top of said furnace provided with means for continuously feeding the sludge material into the top of said furnace, rabbling means provided with teeth cooperating with each of the hearths for periodically agitating and advancing the sludge material over each hearth and gradually from hearth to hearth down through the furnace, a recuperator, a gas outlet adjacent the top of the furnace for the furnace exit gases, and means for withdrawing and conveying gases from said outlet through said recuperator, means for forcing a stream of air through said recuperator in heat interchanging relationship with said exit gases whereby such air is preheated, conduit means communicating with the spaces over a plurality of the hearths for introducing controlled amounts of such preheated air into contact with the sludge material drying and burning at said hearths, and means for burning fuel at a plurality of the points of introduction of such preheated air.

DUDLEY BAIRD.
ROBERT W. ROWEN.